United States Patent
Chmielewski et al.

(10) Patent No.: US 9,679,362 B2
(45) Date of Patent: Jun. 13, 2017

(54) SYSTEM AND METHOD FOR GENERATING TEXTURED MAP OBJECT IMAGES

(75) Inventors: Radoslaw Pawel Chmielewski, Lodz (PL); Michal Wysokinski, Poddebice (PL)

(73) Assignee: TomTom Global Content B.V., Amsterdam (NL)

( * ) Notice: Subject to any disclaimer, the term of this patent is extended or adjusted under 35 U.S.C. 154(b) by 764 days.

(21) Appl. No.: 13/977,792

(22) PCT Filed: Dec. 30, 2010

(86) PCT No.: PCT/EP2010/070902
§ 371 (c)(1),
(2), (4) Date: Sep. 23, 2013

(87) PCT Pub. No.: WO2012/089263
PCT Pub. Date: Jul. 5, 2012

(65) Prior Publication Data
US 2014/0028678 A1    Jan. 30, 2014

(51) Int. Cl.
| G06K 9/00 | (2006.01) |
| G06T 5/00 | (2006.01) |
| G06T 15/04 | (2011.01) |
| G06T 15/20 | (2011.01) |
| G06T 15/50 | (2011.01) |
| G06T 15/80 | (2011.01) |

(52) U.S. Cl.
CPC .............. *G06T 5/002* (2013.01); *G06T 15/04* (2013.01); *G06T 15/205* (2013.01); *G06T 15/50* (2013.01); *G06T 15/80* (2013.01); *G06T 2207/10028* (2013.01)

(58) Field of Classification Search
None
See application file for complete search history.

(56) References Cited

U.S. PATENT DOCUMENTS

| 2006/0132482 A1* | 6/2006 | Oh .......................... G06T 13/80 345/419 |
| 2006/0244746 A1* | 11/2006 | England .................. G06T 11/60 345/419 |
| 2010/0241628 A1* | 9/2010 | Levanon ................ G06Q 30/02 707/741 |

(Continued)

OTHER PUBLICATIONS

Wikipedia, "Normal mapping", achieved on Nov. 16, 2010, accessed on Jan. 27, 2016, <url: https://en.wikipedia.org/wiki/Normal_mapping>.*

(Continued)

*Primary Examiner* — Jason Heidemann

(57) ABSTRACT

A method of producing a textured or pseudo-3D image of one or more map objects is provided comprising acquiring at least one image representing at least part of the one or more map objects. Laser scan data is acquired for the at least one map object, the laser scan data representing distances from a laser scanner to one or more points on at least one surface of the at least one map object. Texture or lighting data associated with the at least one map object is generated from the laser scan data, and the texture or lighting data and the image is processed in order to generate at least one textured or pseudo 3D image at least partially representing the one or more map objects.

18 Claims, 12 Drawing Sheets

(56) References Cited

U.S. PATENT DOCUMENTS

2012/0041722 A1* 2/2012 Quan .................. G06T 7/0071
                                                                703/1

OTHER PUBLICATIONS

Wikipedia, "Google Street View", achieved on Nov. 27, 2010, accessed on Jan. 27, 2016, <url: https://en.wikipedia.org/wiki/Google_Street_View>.*

Wikipedia, "Texture mapping", achieved on Mar. 3, 2010, accessed on Aug. 21, 2016, <url: https://en.wikipedia.org/wiki/Texture_mapping>.*

Debevec P, Tchou C, Gardner A, Hawkins T, Poullis C, Stumpfel J, Jones A, Yun N, Einarsson P, Lundgren T, Martinez P, Fajardo M.: "Estimating Surface Reflectance Properties of a Complex Scene underCaptured Natural Illumination". . . (Dec. 2004) [retrieved on Sep. 26, 2011] XP002660481.

Fausto Bernardini et al: "The 3D Model Acquisition Pipeline", Computer Graphics Forum, Wiley-Blackwell Publishing Ltd, GB, vol. 21, No. 2. XP002546481, 2002.

Christian Frueh et al: "Data Processing Algorithms for Generating Textured 3D Building Facade Meshes from Laser Scans and Camera Images", International Journal of Computer Vision, Kluwer Academic Publishers, BO, vol. 61, No. 2, XP019216432, 2005.

Callieri M et al: "A realtime immersive application with realistic lighting: The Parthenon". Computers and Graphics, Elsevier, GB, vol. 30, No. 3, Jun. 1, 2006 (Jun. 1, 2006) XP025088925.

International Search Report issued on Jan. 11, 2012 for International Application No. PCT/EP2010/070902.

* cited by examiner

US 9,679,362 B2

SYSTEM AND METHOD FOR GENERATING TEXTURED MAP OBJECT IMAGES

CROSS-REFERENCES TO RELATED APPLICATIONS

This application is the National Stage of International Application No. PCT/EP2010/070902 filed Dec. 30, 2010 and designating the United States. The entire content of this application is incorporated herein by reference.

FIELD OF THE INVENTION

The present invention relates to a system and method for generating textured or pseudo 3D images of map objects, preferably using laser scan data. Specific embodiments of the present invention relate to a method for generating pseudo 3D or textured images of building facades or surfaces.

BACKGROUND TO THE INVENTION

Systems for detection of texture elements from data obtained by mobile mapping systems (MMS) are known in the art. A MMS may be provided with one or more cameras that take pictures of the environment surrounding the MMS and are controlled by a processor on board the MMS. A MMS may take the form of a vehicle such as a car that is driven along roads of interest while the processor controls the camera(s) to take pictures of building facades. The locations of texture elements, like windows and doors, in the facade pictures are identified. The texture elements present in these facade pictures are then substituted by standard texture elements stored in a library that is accessible by the processor. Since these standard texture elements are used to construct the facades, the memory space required to store facades with their texture elements may be much less than the space required for storing all the original pictures with their original textures.

To build a textured 3D facade model, a good method for identification of such texture elements in the raw picture of the facade is required. Methods for analyzing and decomposing texture from pictures are known in the prior art. However, there is a chance that incorrect objects are identified as being texture elements, such as trees, cars, people, and other obstacles in front of a facade. Also, the methods may require heavy computational power. Moreover, the prior art processes require a high degree of human interaction to obtain good quality for the textural representation of the facade. The speed of manual extraction may be only 1 km/h, on average, which, in total, would bring a cost of thousands of man hours for an average sized city.

At least one object of at least one embodiment of the present invention is to overcome at least one of the above problems in the prior art.

SUMMARY OF INVENTION

According to a first aspect of the present invention is a method of producing a textured or pseudo-3D image of one or more map objects, comprising:

acquiring at least one image representing at least part of the one or more map objects;

acquiring laser scan data for the at least one map object, the laser scan data representing distances from a laser scanner to one or more points on at least one surface of the at least one map object;

generating texture or lighting data associated with the at least one map object from the laser scan data;

processing the texture or lighting data and the image in order to generate at least one textured or pseudo 3D image at least partially representing the one or more map objects.

The map object may comprise a building. The at least one surface of the map object may comprise at least one building facade.

The method may comprise generating a depth map. The depth map may comprise, or be representative of, distances from a position of the laser scanner to one or more points on the at least one surface of the at least one map object. The depth map may comprise, or be representative of, distances from the surface of the map object, which may be distances relative to points of the facade furthest from the laser scanner. The position of the laser scanner may be the position of the laser scanner when collecting the distance or depth data.

The depth map may comprise an image, such as a greyscale image. The depth map may comprise a plurality of pixels. One or more pixels of the depth image may comprise a pixel value, such as a greyscale value. The pixel value(s) may be representative of the distance between the laser scanner and the surface of the map object and/or the distance from the surface of the map object. The pixel value(s) may be darker for points further from the laser scanner and/or closer to the surface of the map object and lighter for point closer to the laser scanner and/or further from the surface of the map object.

The method may comprise projecting at least one laser beam generated by the laser scanner onto the at least one surface of the map object and/or receiving a reflected laser beam. The method may comprise determining data indicative of a distance of the laser scanner from at least one point on the at least one surface of the at least one map object.

The acquiring of laser scan data may comprise collecting position data of the laser scanner, the position data being associated with laser scan data taken using the laser scanner in that position. The acquiring of laser scan data may comprise retrieving previously collected laser scan data, for example, from a database and/or server.

The method may comprise acquiring coordinates or polygons associated with the at least one map object, which may define dimensions and/or locations of at least part and preferably the whole of the at least one surface of the at least one map object.

The method may comprise filling in one or more gaps in the depth map for which no distance data is available, which may comprise interpolation between two or more points of the depth map for which distance data is available. The filling in of gaps may comprise blurring and/or use of a maximum filter.

The filling in of one or more gaps in the depth map may produce a gap filled depth map. The gap filled depth map may be an image.

The method may comprise determining a normal map, which may be determined from the depth map or gap filled depth map.

The normal map may be an image. The generation of a normal map may comprise using a graphics processing unit (GPU) to generate the normal image.

The normal map may comprise or be representative of one or more normal vectors of at least one and preferably each point of the at least one surface of the at least one map object.

The normal map may comprise one or more pixels, such as colour pixels. Each pixel may be associated with a pixel value, which is preferably a colour value, such as a red-green-blue (RGB) value. One or more pixel values may be representative of a normal vector associated with at least one point of at least one surface of the at least one map object. For example, the red, green and blue values of a pixel may be representative of x, y, z (of a Cartesian coordinate system) or $\theta$, $\phi$ and r (of a polar coordinate system) coordinates defining the normal vector for a point of a surface of the map object represented by that pixel.

Generating of the normal map from the depth map or gap filled depth map may comprise, for at least one and preferably each pixel of the depth map or gap filled depth map, taking the cross product of at least three closest points to the pixel on the depth map or gap filled depth map in order to determine a normal vector of a point of the surface of the map object associated with that pixel of the depth map or gap filled depth map. The normal vector may be normalized. The normal vector may be used to generate at least part of the normal map, such as a pixel value, preferably a pixel colour.

The method may comprise generating a texture or light map. The texture or light map may be derived from the normal map. The texture or light map may be an image. The texture or light map may comprise one or more pixels. The texture or light map may be representative of light reflected from, and/or shadows on, the surface of the map object.

The generation of the texture or light map may comprise providing at least one light source position and may further comprise providing or determining at least one normalized light direction vector representative of a direction of the light source from at least one point on the at least one surface of the at least one map object.

The generation of the texture or light map may comprise taking the dot product of at least one and preferably each normal vector represented by at least one and preferably each point or pixel in the normal map and the at least one normalized light direction vector from the light source position to a point of the surface of the map object associated with the point or pixel of the normal map.

Generation of the texture map may be at least partially and preferably wholly performed or performable using a graphics processor.

Generating the texture data may comprise adding or combining the texture map and the image at least partially representing the one or more map objects. Generating the texture data may comprise adding the pixel values, such as colour values, of the texture map and pixel values of the image at least partially representing the one or more map objects, on a pixel by pixel basis.

The method may comprise acquiring location data associated with the laser scanner position. The method may comprise generating a pseudo 3D view of the map object based on the at least one textured or pseudo 3D image at least partially representing the one or more map objects and the location data.

The method may comprise providing the at least one textured or pseudo 3D image at least partially representing the one or more map objects to a navigation system for display.

According to a second aspect of the present invention is a system for producing a textured image of one or more map objects, comprising:

a processor configured to acquire at least one image at least partially representing the one or more map objects, acquire laser scan data of the at least one map object, the laser scan data representing distances from a laser scanner to one or more points on at least one surface of the at least one map object, generate texture or light data associated with the at least one map object from the laser scan data, and process the texture or light data and the image in order to generate at least one textured or pseudo 3D image at least partially representing the one or more map objects.

The processor may comprise, or is, a graphics processing unit (GPU).

The system may be configured to implement the method of the first aspect.

According to a third aspect of the present invention is a mobile mapping system comprising the system of the second aspect, the mobile mapping system further comprising at least one laser scanner.

The mobile mapping system may comprise at least one camera. The mobile mapping system may comprise location determination apparatus. The mobile mapping system may comprise, or be comprised in, a vehicle such as a car or van.

The system may be configured to generate at least one textured or pseudo 3D image at least partially representing the one or more map objects from laser scan data obtained using the at least one laser scanner and/or at least one image at least partially representing the one or more map objects obtained using the at least one camera.

According to a fourth aspect of the present invention, there is provided a computer program element comprising computer program code means to make a computer execute the method as set forth above in relation to the first aspect of the invention or to implement the apparatus as set forth in the second or third aspects of invention.

The computer program element may be embodied on a computer readable medium.

According to a fifth aspect of the present invention is an apparatus when programmed with the computer program product of the fourth aspect.

Advantages of these embodiments are set out hereafter, and further details and features of each of these embodiments are defined in the accompanying dependent claims and elsewhere in the following detailed description.

It will be appreciated that features described in relation to any of the above aspects of invention may also optionally be applicable to any other aspect of invention. Furthermore, it will also be appreciated that method features analogous to any described apparatus features are intended to fall within the scope of the disclosure and vice versa.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Figure 1:
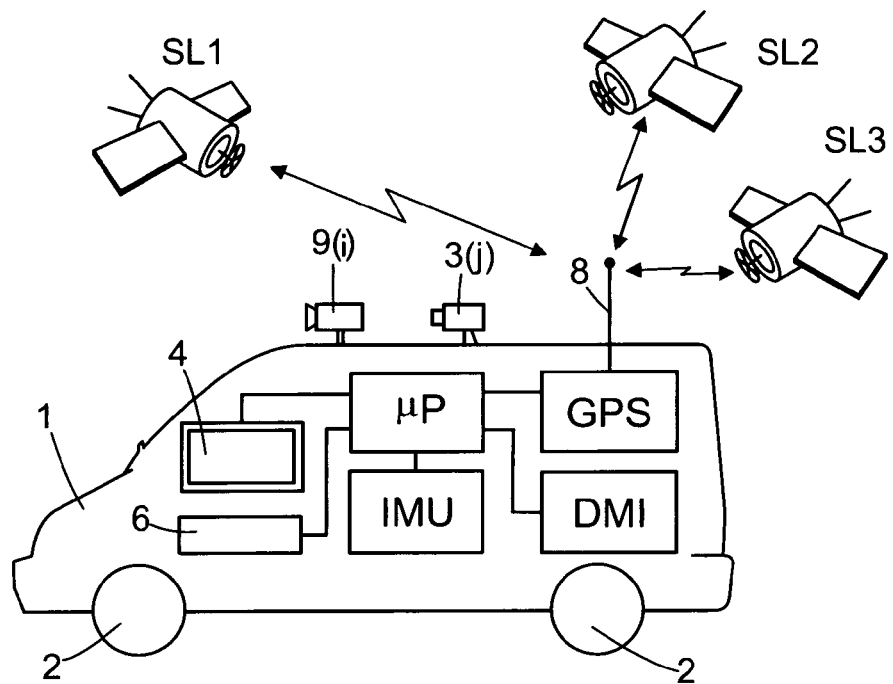
FIG. 1 shows a mobile mapping system (MMS) with a camera and a laser scanner.

Throughout the following description identical reference numerals will be used to identify like parts.

FIG. 1 shows a mobile mapping system (MMS) system that takes the form of a car 1. The car 1 is provided with one or more cameras 9(*i*), i=1, 2, 3, . . . , I, and one or more laser scanners 3(*j*), j=1, 2, 3, . . . , J. The car 1 can be driven by a driver along roads of interest.

The car 1 is provided with an accurate position determination device. As shown in FIG. 1, the position determination device comprises a global positioning system (GPS) unit, a microprocessor μP, a distance measurement instrument (DMI), and an inertial measurement unit (IMU).

The GPS unit is connected to an antenna 8 and arranged to communicate with a plurality of satellites SLi (i=1, 2, 3, . . . ) having known positions. The GPS unit is operable to calculate a position signal from signals received from the satellites SLi.

The GPS unit is connected to the microprocessor μP. Based on the signals received from the GPS unit, the microprocessor μP is operable to determine suitable display signals to be displayed on a monitor 4 in the car 1, informing the driver where the car is located and possibly in what direction it is travelling.

The DMI is an odometer that measures a distance traveled by the car 1 by sensing the number of rotations of one or more wheels 2. The DMI is also connected to the microprocessor μP to allow the microprocessor μP to take the distance as measured by the DMI into account while calculating the display signal from the output signal from the GPS unit.

The IMU can be implemented, for example, as three gyroscope units arranged to measure rotational accelerations and translational accelerations along three orthogonal directions. The IMU is also connected to the microprocessor μP to allow the microprocessor μP to take the measurements by the DMI into account while calculating the display signal from the output signal from the GPS unit.

The system as shown in FIG. 1 is a so-called "mobile mapping system" that is operable to collect geographic data, for instance by taking pictures with one or more camera(s) 9(*i*) mounted on the car 1. The camera(s) are connected to the microprocessor μP. Moreover, the laser scanner(s) 3(*j*) take laser samples while the car 1 is driven past building blocks of interest. The laser scanner(s) 3(*j*) are also connected to the microprocessor μP, which is configured to receive the laser scan data from the laser scanners.

It is a general desire to provide accurate location and orientation measurements from the location measurement units, i.e. the GPS, IMU and DMI. The location and orientation data is measured while the camera(s) 9(*i*) take pictures and the laser scanner(s) 3(*j*) take laser scan data. Both the pictures and the laser scan data are stored for later use in a suitable memory of the microprocessor in association with corresponding location and orientation data of the car 1 at the time the pictures and laser scan data were taken. The pictures and laser scan data include information relating to building block facades.

Figure 2:
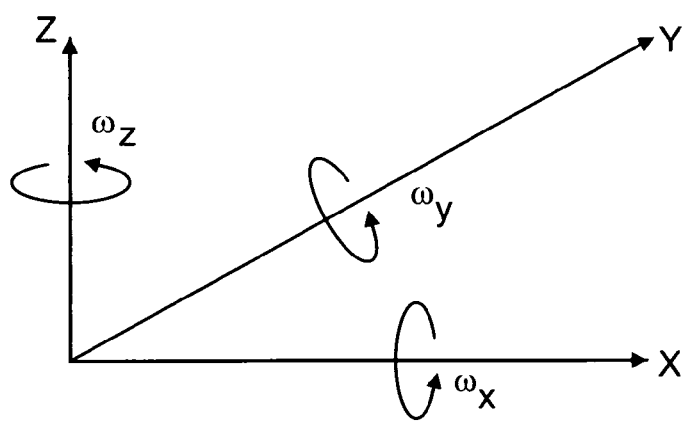
FIG. 2 shows a diagram of location and orientation parameters.

Optionally, the laser scanner(s) 3(*j*) are arranged to produce an output of at least 50 Hz and 1° resolution in order to produce a dense output. A laser scanner such as MODEL LMS291-S05 produced by SICK is capable of producing such output. FIG. 2 shows which position signals can be obtained from the three measurement units GPS, DMI and IMU shown in FIG. 1. FIG. 2 shows that the microprocessor μP is arranged to calculate six different parameters, i.e., three distance parameters x, y, z relative to an origin in a predetermined coordinate system and three angle parameters $\omega_x$, $\omega_y$ and $\omega_z$, which denote a rotation about the x-axis, y-axis and z-axis respectively. The z-direction coincides with the direction of the gravity vector.

The microprocessor μP in the car 1 and memory 9 may be implemented as part of a computer based arrangement or system.

Figure 3:
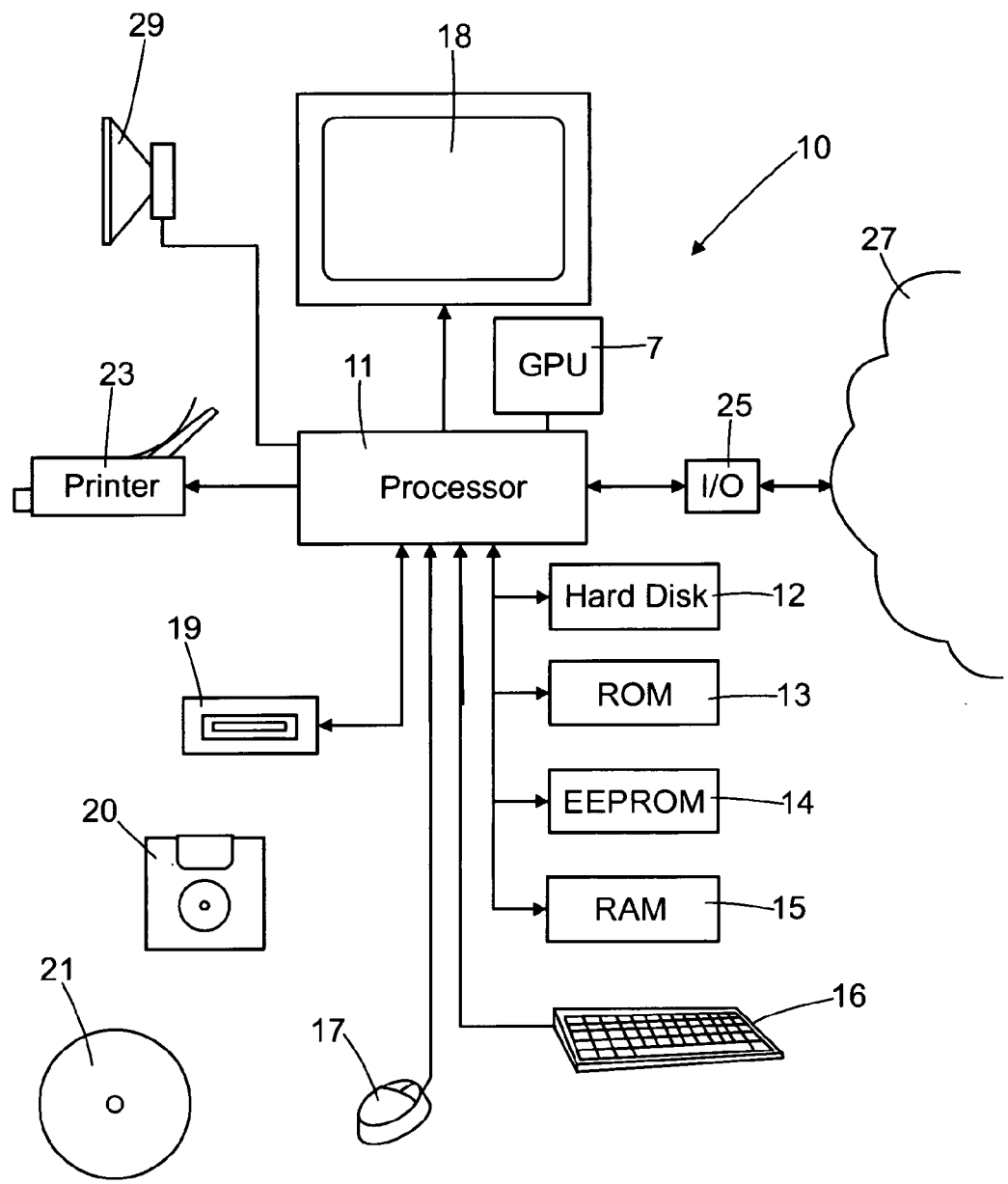
FIG. 3 shows a block diagram of a computer based arrangement with may be used in the implementation of the invention.

In FIG. 3, an overview is given of a suitable computer system 10 comprising a processor 11 for carrying out arithmetic operations. The system is also provided with a graphics processor unit 7. In the embodiment shown in FIG. 1, the processor 11 would be the microprocessor μP. The processor 11 is connected to a plurality of memory components, including a hard disk 12, Read Only Memory (ROM) 13, Electrically Erasable Programmable Read Only Memory (EEPROM) 14, and Random Access Memory (RAM) 15. Not all of these memory types need necessarily be provided. Moreover, these memory components need not be located physically close to the processor 11 but may be located remote from the processor 11.

The processor 11 is also connected to means for inputting instructions, data etc. by a user, like a keyboard 16, and a mouse 17. Other input means, such as a touch screen, a track ball and/or a voice converter, known to persons skilled in the art may also be provided. A reading unit 19 connected to the processor 11 is provided. The reading unit 19 is arranged to read data from and/or write data to a data carrier like a floppy disk 20 or a CDROM 21. Other data carriers may be tapes, DVD, CD-R. DVD-R, memory sticks etc. as is known to persons skilled in the art.

The processor 11 is also connected to a printer 23 for printing output data on paper, as well as to a display 18, for instance, a monitor or LCD (Liquid Crystal Display) screen, or any other type of display known to persons skilled in the art.

The processor 11 may be connected to a loudspeaker 29.

The processor 11 may be connected to a communication network 27, for instance, the Public Switched Telephone Network (PSTN), a Local Area Network (LAN), a Wide Area Network (WAN), the Internet etc. by means of communications system 25. The processor 11 may be arranged to communicate with other communication arrangements through the network 27. The data carrier 20, 21 may comprise a computer program product in the form of data and instructions arranged to provide the processor with the capacity to perform a method in accordance with the invention. However, such computer program product may, alternatively, be downloaded via the telecommunication network 27. The processor 11 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 11 through the network 27. The computer arrangement does not need to have all components shown in FIG. 3, particularly when applied in the car 1. For instance, the computer arrangement does not need to have a loudspeaker and printer. As for the implementation in the car 1, the computer arrangement needs at least processor 11, some memory to store a suitable program and some kind of interface to receive instructions and data from an operator and to show output data to the operator.

For post-processing the pictures and scans taken by the camera(s) 9(i) and the laser scanner(s) 3(j), a similar system to the one shown in FIG. 3 will be used. The system need not be located in the car 1 but may conveniently be located, for example, in a building for off-line post-processing. The pictures and scans taken by camera(s) 9(i) and scanner(s) 3(j) are stored in one of the memories 12-15. That can be done via storing them first on a DVD, memory stick or the like, or transmitting them via the communications system 25, possibly wirelessly, from the memory 9.

Figure 4:
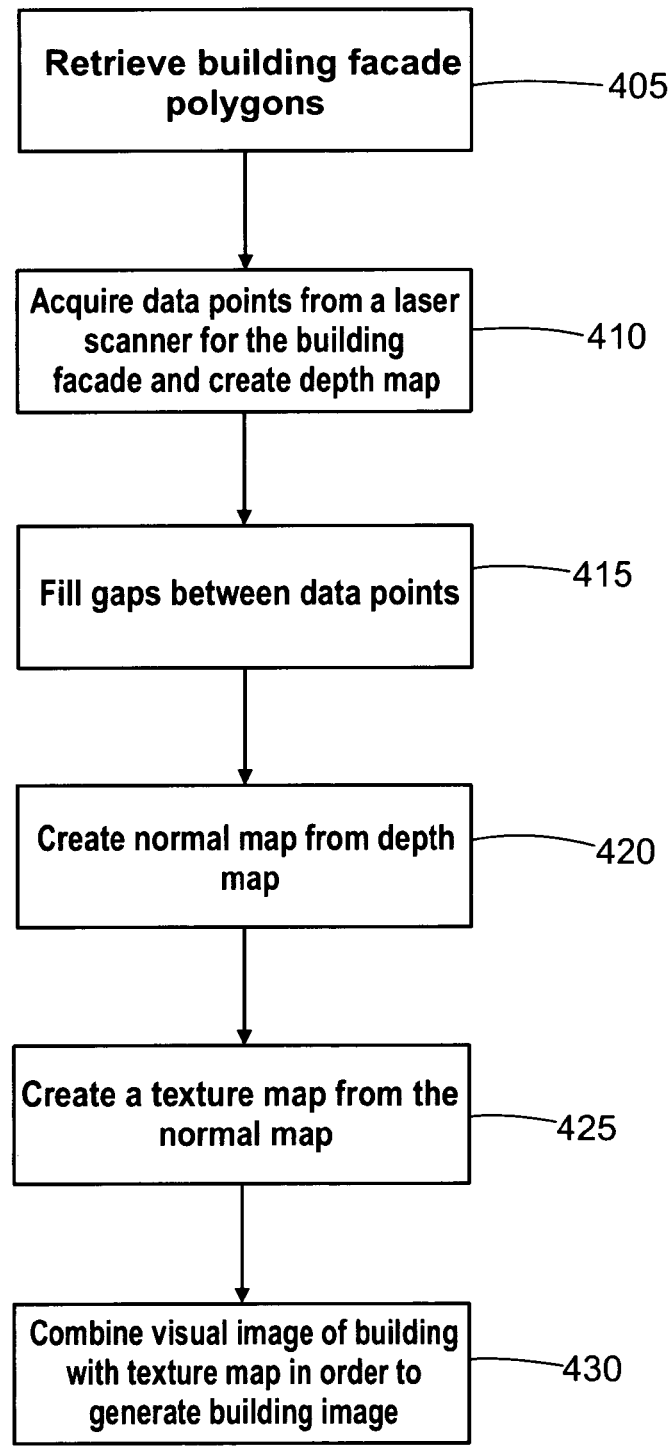
FIG. 4 is a flow chart of an example of a process for generating images of map objects according to the invention.

FIG. 4 illustrates a method for generating pseudo-3D or textured images of buildings using the visual images of the buildings taken using the camera(s) 9(i) and data obtained using the laser scanner(s) 3(j).

Figure 5:
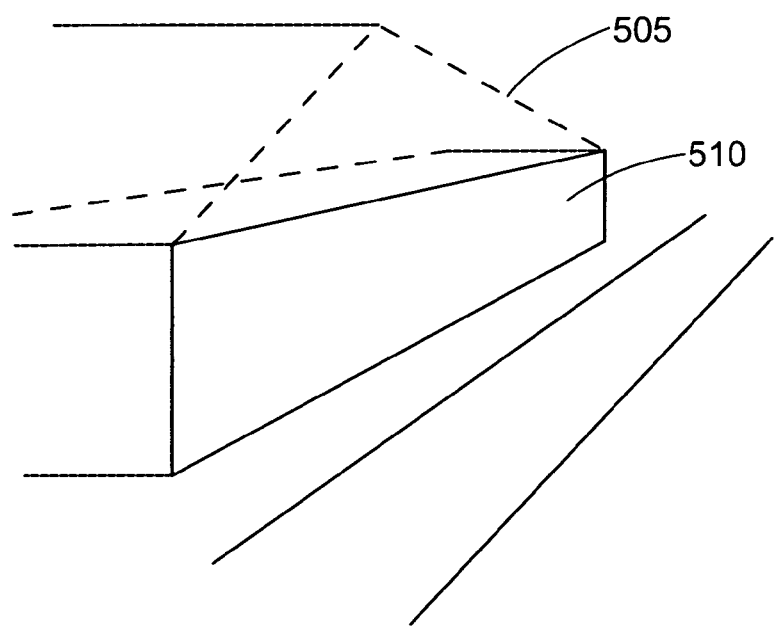
FIG. 5 is a schematic of an example of 3D polygon data representing a map object in the form of a building.
Figure 6:
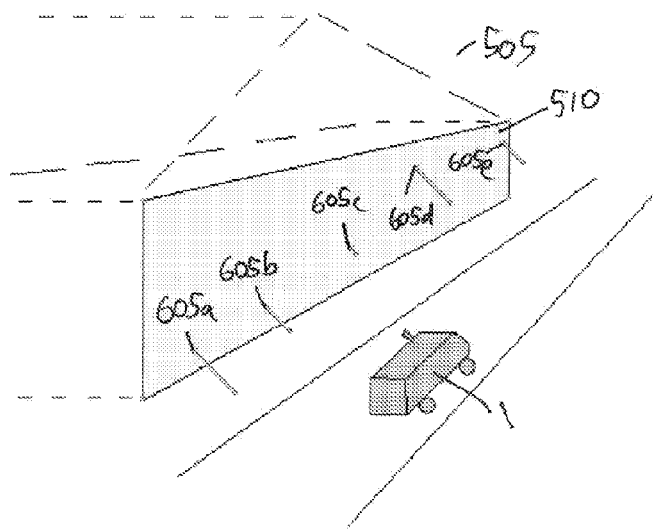
FIG. 6 is an illustration of the collection of laser scan data for the building represented in FIG. 5 using the MMS of FIG. 1.
Figure 7:
FIG. 7 is an example of a depth map generated from laser scan data.

The processor 11 is operable to acquire polygon data representative of a mapping object such as a building, as indicated in step 405. The polygon data describes the locations of the building 505 and of the perimeters and vertices of facades or exterior surfaces 510 of the building 505 in 3D space, as shown in FIG. 5. It will be appreciated that the polygon data may be retrieved from pre-generated polygon data or created, for example, from laser scan data obtained using the laser scanner(s) 3(j) and/or camera(s) 9(i) and/or location determining sensors such as the GPS, IMU and DMI sensors of a MMS 1.

If the coordinates of the building façade or external surface 510 are known, and if laser scan data is not already available for the building 505, then the location of the building 505 from the polygon data allows the MMS 1 to be driven to the building, whereupon the laser scanner(s) 3(j) may be used to project laser points 605a-e onto the building 505. The laser points 605a-e are reflected from the building facade or external surface 510 and collected by the laser scanner(s) 3(j), whereupon the transit time of the laser beam(s) may be used to determine a distance of that point 605a-e on the building facade 610.

Alternatively, if the coordinates of the building 505 and/or facade 610 are unavailable, the laser scan data may be collected by the MMS 1 along with location data using the location determining sensors such as the GPS, IMU and DMI sensors, which may be carried out whilst collecting images of the facade 610 using the camera(s) 9(j).

The laser scan data is then processed and used to generate a depth map 705, as indicated in step 410 of FIG. 4. The depth map 705 is an image, such as a greyscale image, where the pixels of the depth map 705 have a pixel value, such as a greyscale value, that is representative of the distance from the laser scanner 3(i) to a corresponding point 605a-e on the building facade 510, which it will be appreciated may also be equivalent to a depth into or projecting out of the facade 510. For example, black pixels may be representative of a pixel furthest from the laser scanner 3(i) or at a most recessed part of the facade or surface 510 whilst white pixels may be used to represent points that are furthest from or most projected from the surface 510, i.e. closest to the laser scanner 3(i), with points having intervening depths or distances being assigned a corresponding greyscale vale representative of their depth or distance.

It will be appreciated that the laser scanner 3(i) projects a matrix of laser points onto the building facade or surface 510. As such, gaps exist in the depth map 705 corresponding to parts of the building facade 510 for which no laser scan data is available, i.e. where the laser beams from the laser scanner(s) 3(i) were not projected on the facade 510.

The processor 11 or graphical processor 7 is operable to fill the gaps in the depth map in order to produce a gap filled depth map 805a, 805b, as indicated in step 415 of FIG. 4. The gaps may be filled using a variety of techniques such as interpolation between neighbouring points for which laser scan data is available or by using techniques such as maximum filters or blurring, the results of which are respectively shown in FIGS. 8 and 9.

Figure 10:
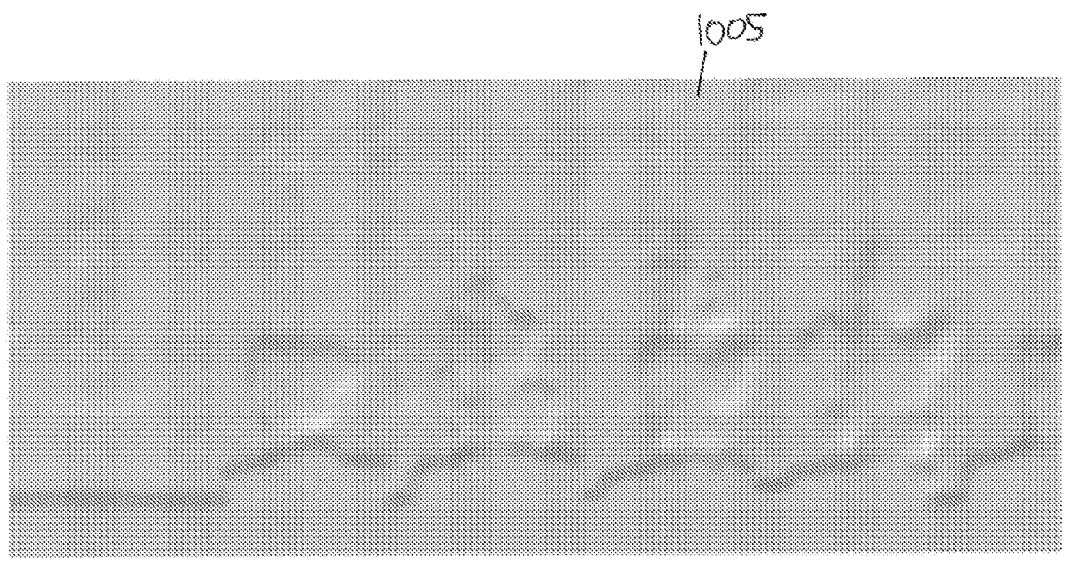
FIG. 10 is a normal map generated from the gap filled depth map of FIG. 8 or FIG. 9.

By way of an example, the maximum filter method comprises breaking the depth map 705 down into portions or windows, for example, 3×3 pixel windows. The pixel value of the centre pixel in each of the portions or windows is then changed to a value equal to the pixel value of the brightest pixel in the portion or window, The gap filled depth map 805a, 805b is then processed in order to generate a normal map 1005 for the facade 510, as shown in FIG. 10 and indicated as step 420 of FIG. 4. The normal map 1005 is an image wherein pixels of the image have a pixel value that is representative of a normal vector of the facade surface 1005 associated with that pixel of the normal map 1005. The normal vector is a vector that is perpendicular to the facade 510 at that point.

The normal vector for each pixel in the normal map 1005 is determined by processing the gap filled depth map 805a, 805b. For each pixel of the gap filled depth map 805a, 805b, the cross product of three or more closest surrounding pixels is taken, the result of which is a vector representing the normal to the facade 510 at a point represented by that pixel of the gap filled depth map 805a, 805b. The normal vector is then normalized, for example, such that the normal vector is representable in a Cartesian coordinate system by x, y, and z values between −1 and 1. The normalized normal vector direction may be represented in 3 dimensions.

A suitable pixel value for representing the normal vector is the pixel colour. For example, the pixel colour may be defined using a red-green-blue (RGB) format, which may be associated with red, green and blue values ranging between 0 and 255, for example. The red, green and blue values can be used to represent the x, y, and z dimensions of the normalized normal vector. For example, a red value of 0 may be representative of an x-dimension of the normal vector of −1, a red value of 128 may be representative of an x-dimension of 0 and a red value of 255 may be representative of an x-dimension of +1. The x-dimensions between −1 and 1 are represented by appropriate red values between 0 and 255. The green and blue values may be used to represent the y and z dimensions of the associated normalized normal vector in similar fashion.

Figure 11:
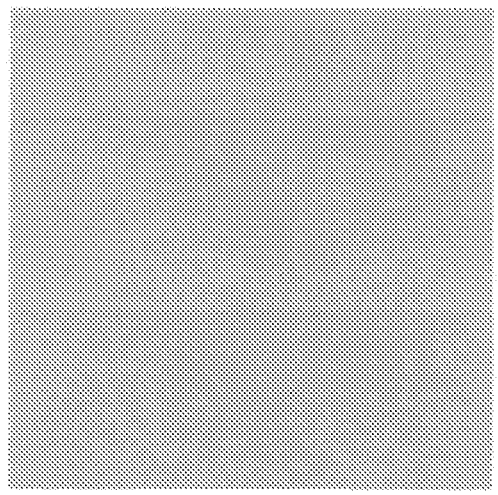
FIG. 11 is an example of a normal map of a flat surface, the surface being in an x-y plane.

As an example, a normal map for a completely flat surface in the x-y plane would be represented by a solid purple square, as shown in FIG. 11, with each pixel having an RGB value of R=128, G=128, B=255, which would represent a normalized normal vector direction of x=0, y=0 and z=1.

Figure 12:
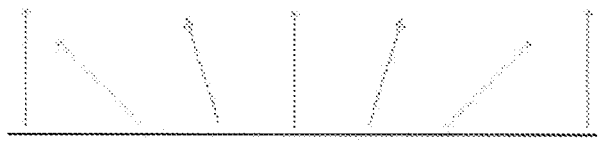
FIG. 12 is schematic of the normal vectors for a hemispherical object projecting from a flat surface.
Figure 13:
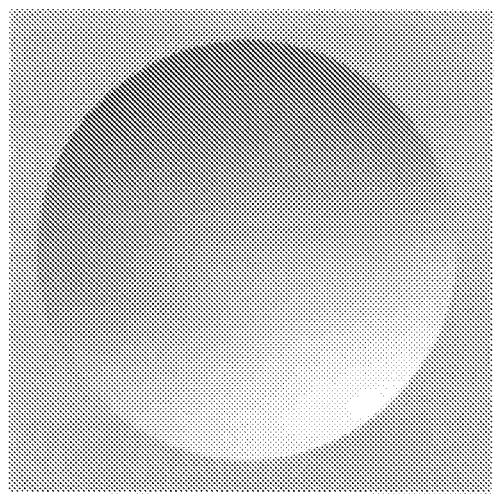
FIG. 13 is an example of a normal map representing a hemispherical object projecting from a flat surface.

As another example, a hemispherical object projecting in the z-direction from a flat surface in the x-y plane, having normal vectors across a cross section through its centre as shown in FIG. 12, would be represented by a by a circular spectrum of colours having R values ranging from 0 to 255, G values ranging from 0 to 255 and B values ranging from 0 to 255, representative of x-dimensions between −1 and 1, y dimensions between −1 and 1 and z dimension between 0 and 1, as shown in FIG. 13.

Figure 14:
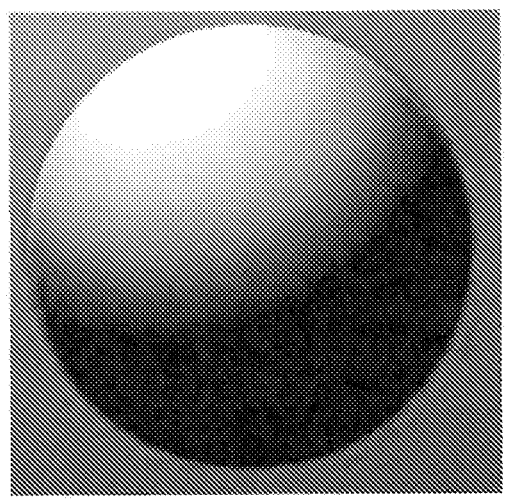
FIG. 14 is an example of a light map generated by the interaction of the normalized light vector and hemispherical object of FIG. 13.

The normal map image 1005 is then processed in order to form a texture map 1405, 1505, shown in FIGS. 14 and 15 respectively, as indicated in step 425 of FIG. 4. The texture map 1405, 1505 is indicative of light reflections from the facade or surface 410 of the building 405 and shadows formed thereon. The texture map 1405, 1505 is used to calculate the colour of each pixel of the façade 410. A position of at least one light source 1605, shown in FIG. 16, is generated or provided. The texture map 1405, 1505 is formed from the normal map 1005 using two normalized vectors, namely normal vectors from the normal map 1005 and normalized vectors representing the direction to the light source 1605. In particular, for each pixel in the normal map 1005, a normalized vector representing the direction of the light source 1605 from the pixel is calculated. A colour value for that pixel is then determined by taking the dot product of the normal map vector for that pixel with the normalized light direction vector for that pixel, as indicated in the equation 1 below:

Normal Map Vector DOT Normalized Light Direction Vector EQUALS Colour value.   (Equation 1)

The result of the above equation, using two normalized vectors, is in range of −1 and 1. Therefore, a rescaling operation is performed to convert these values to be within a range of between zero and one.

Figure 15A:
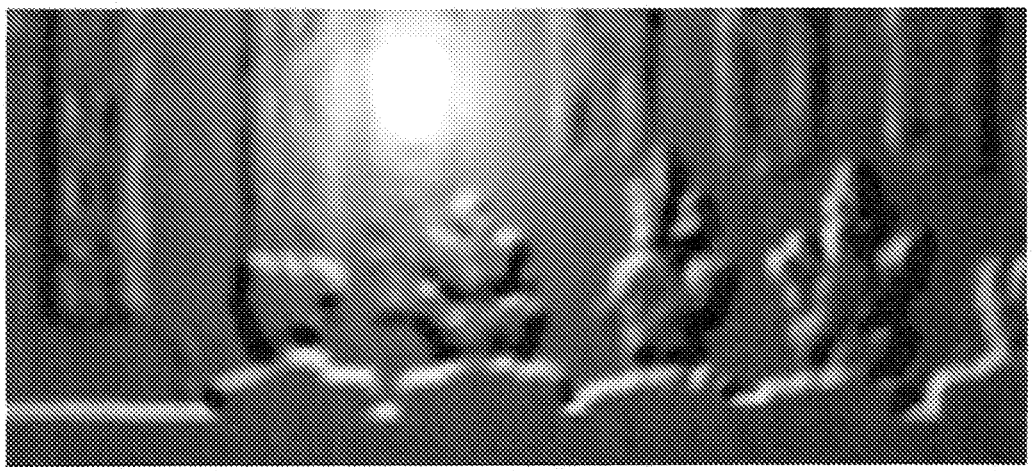
FIG. 15A is a light map generated from the normal map of FIG. 15 for a light in a first exemplary position.
Figure 15B:
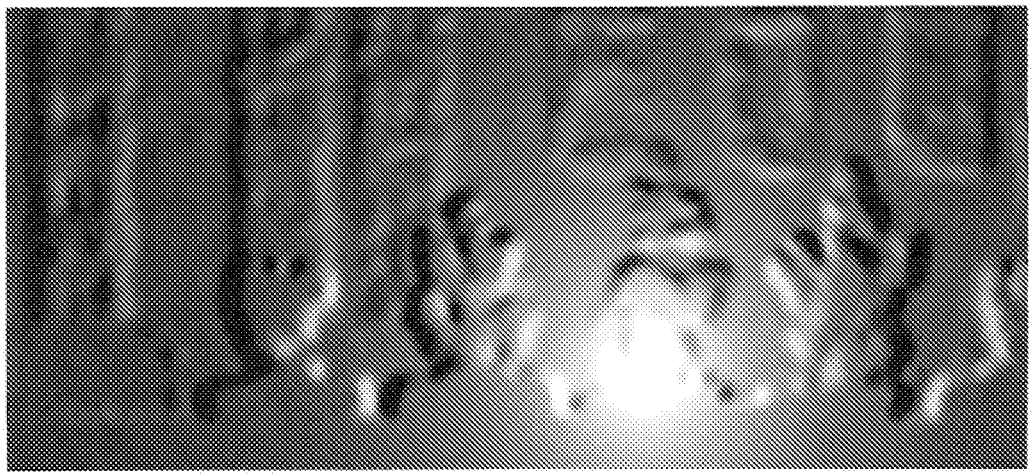
FIG. 15B is an alternative light map generated from the normal map of FIG. 15 for a light in a second exemplary position.
Figure 16:
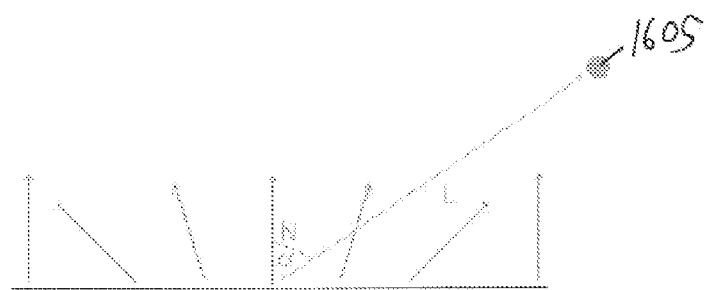
FIG. 16 is an example of a relationship between a normalized light direction vector and a normal vector of the surface of the hemispherical object represented by FIG. 12.

It can be seen from FIGS. 14, 15A and 15B that the result of this processing is an image having highlights and shadows that gives an impression of three dimensions.

In this way, the normal map 1005 can be used to reduce the number of the polygons required to represent a building 505 in three dimension by allowing the possibility to create an illusion of texture such as bumps, hollows and contours for a specific surface. The only need is to have a light source location and a normal map that can be used to calculate the dot product for two vectors.

Figure 8:
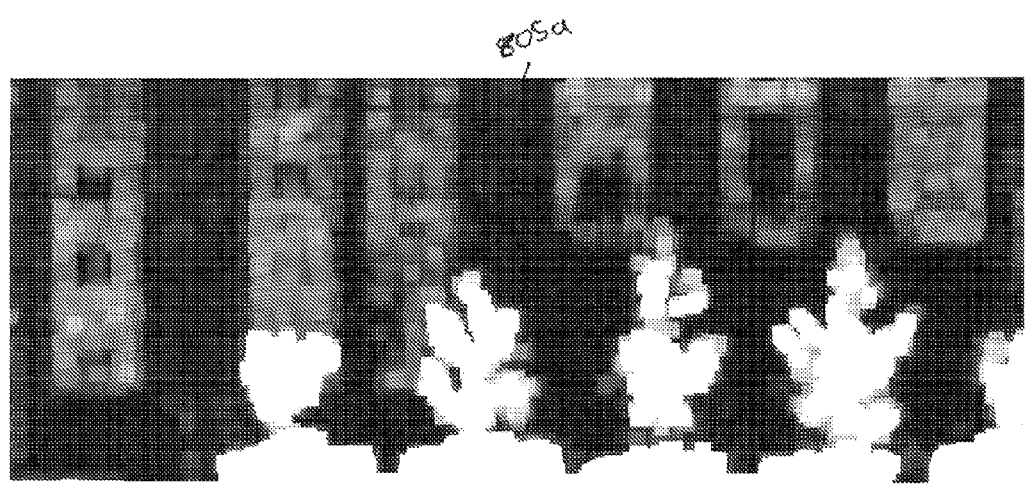
FIG. 8 is a gap filled depth map generated from the depth map of FIG. 7 using the maximum filter technique.
Figure 9:
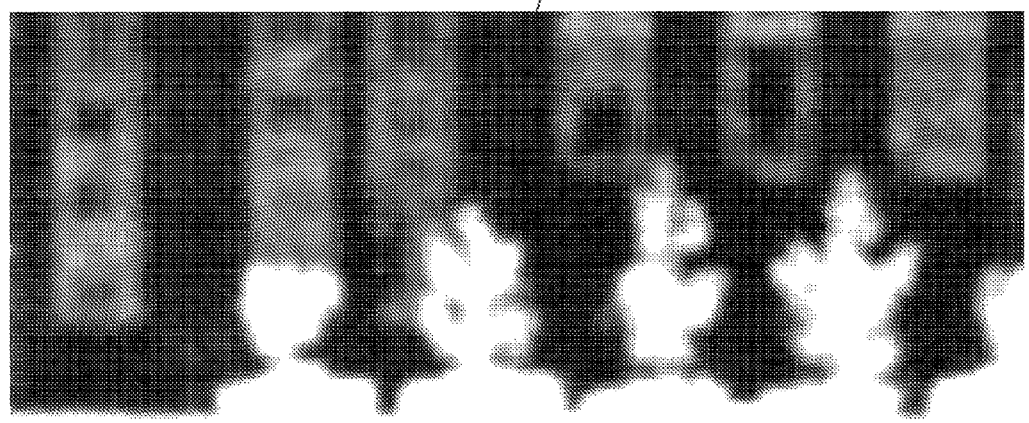
FIG. 9 is a gap filled depth map generated from the depth map of FIG. 7 using a blurring technique.

An example of the application of this technique to the gap filled normal map shown in FIGS. 8 and 9 is illustrated with reference to FIGS. 10, 15A and 15B.

In this case, the gap filled depth map images 805*a*, 805*b* are processed on a pixel by pixel basis by determining the cross product of the pixel values of three pixels of the gap filled depth map 805*a*, 805*b* that are closest to the pixel in question in order to determine a normal vector for a point of the facade 510 of the building 505 represented by the appropriate pixel in the gap filled depth map 805*a*, 805*b*. The normal vector for each point is then normalised and converted into RGB format and used to form the normal map 1005, which is shown in FIG. 10.

The normal map 1005 is then used to generate texture maps 1505*a*, 1505*b* corresponding to any given light position by taking the dot product of the normal vector and the normalized light direction vector for each pixel of the normal map 1005. Examples of texture maps 1505*a*, 1505*b* generated using two different light source positions 1605 are shown in FIGS. 15A and 15B.

Figure 17:
FIG. 17 is a two dimensional image of the building represented in FIGS. 7 to 9 and 10, 15A and 15B.

A textured image of the building facade 510 can be generated by combining a corresponding 2D image 1705 of the facade 510, as shown in FIG. 17, with the texture map 1505*a*, 1505*b* generated from the laser scan data. The 2D images 1705 may be obtained, for example, from the camera(s) 9(*j*) of the MMS 1, which may be obtained during collection of laser scan data.

Figure 18A:
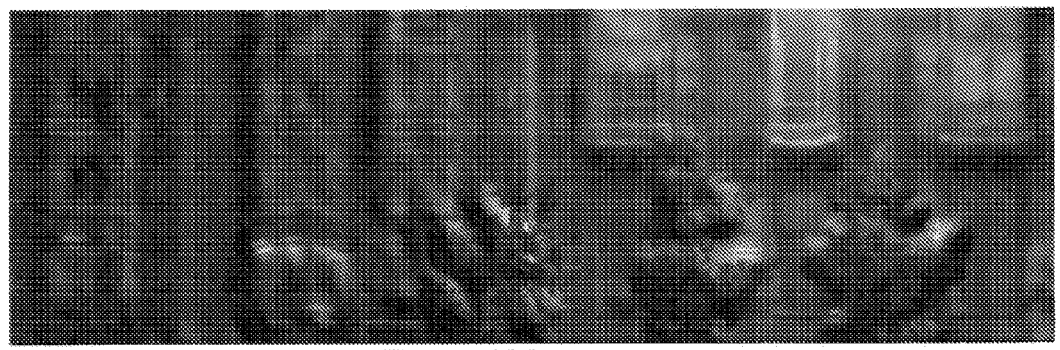
FIG. 18A is a textured pseudo-3D image generated using the light map of FIG. 15A and the image of FIG. 17.
Figure 18B:
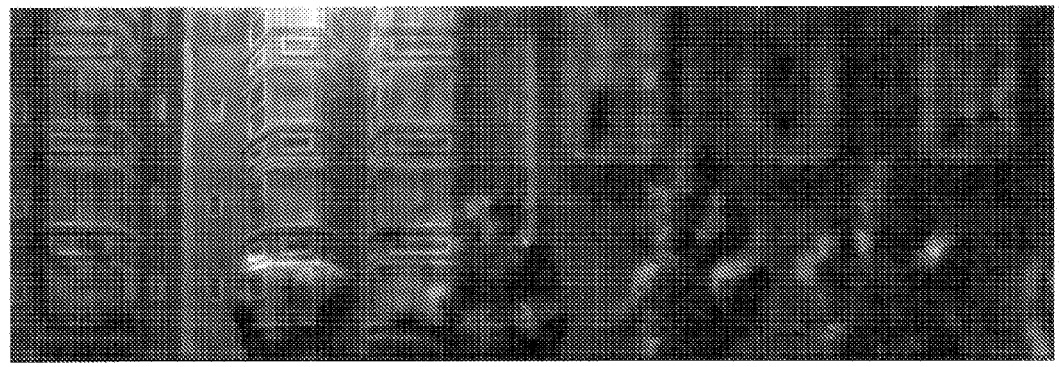
FIG. 18B is a textured pseudo-3D image generated using the light map of FIG. 15B and the image of FIG. 17.

The texture map 1505*a*, 1505*b* for a given light position 1605 may be added to the image 1705, for example, by adding the RGB values for each pixel of the texture map 1505*a*, 1505*b* to the RGB values of corresponding pixels of the image 1705 in order to form a pseudo 3D textured image 1805 of the building 505, a shown in FIGS. 18*a* and 18*b* for varying light positions 1605.

This provides a high quality texture to the building images 1806 for a given light source 1605 and direct illumination. A further benefit is that, the calculations using the normal maps 1005 are image processing/modification operations that can be carried out on a graphics processing unit (GPU) 7 rather than a central processing unit (CPU) 11, thereby increasing the rendering speed. Furthermore, the number of polygons required to form 3D geographical maps can be reduced.

The textured pseudo 3D images 1805 produced may advantageously be used, for example, in satellite navigation systems and the like in order to represent locations such as destinations or present locations to the user. However, it will be appreciated that other uses for such pseudo 3D map images would be apparent to a person skilled in the art.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

The above example advantageously described the application of laser scan data and a method for generating pseudo 3D textured images of building facades comprising use of depth map images and normal map images. However, it will be appreciated that the same technique may be applied to generate textured images of other geographic map features such as geological structures, man-made structures or natural other than buildings, botanical features or the like.

Whilst embodiments described in the foregoing detailed description refer to GPS, it should be noted that the mobile device 200 may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location, such as location determination systems based on image recognition, laser based systems and/or user input.

In addition, whilst various examples of gap filling techniques are described, such as interpolation, maximum filtering and blurring, it will be appreciated that other gap filling techniques known in the art or apparent to a skilled person may be used.

Furthermore, various examples of non-GPS sensors have been described, such as an IMU or DMI, it will be appreciated that a suitable system need not have all of the non-GPS sensors described but may instead have alternative or varying combinations of non-GPS sensors, which may include non-GPS sensors other than those described herein that would be apparent to a person skilled in the art in view of the teaching of the present application.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of producing a pseudo-3D image of one or more map objects, comprising:
    acquiring, by a processor, an image representing at least part of map object;
    acquiring, by the processor, laser scan data for the at least part of the map object, the laser scan data representing distances from a laser scanner to one or more points on at least one surface of the map object;
    determining, by the processor, a normal map, the normal map comprising or being representative of one or more normal vectors of at least one point of the at least one surface of the at least one map object;
    normalizing, by the processor, said one or more normal vectors;
    generating, by the processor, from the normal map, a texture map associated with the at least one map object from the laser scan data, the texture map being representative of light reflected from and/or shadows on the at least one surface of the map object;
    processing, by the processor, the texture map and the image by combining corresponding portions of the texture map and image in order to generate a pseudo 3D image representing the at least part of the map object.

2. The method according to claim 1, wherein the map object comprises a building and the at least one surface of the map object comprises at least one building facade.

3. The method according to claim 1, wherein the method comprises generating a depth map, the depth map comprising, or being representative of, at least one of: (i) distances from a position of the laser scanner to one or more points on the at least one surface of the at least one map object; and (ii) distances from the surface of the map object.

4. The method according to claim 3, wherein the depth map comprises an image comprising a plurality of pixels, wherein at least one pixel value may be representative of at least one of: (i) the distance between the laser scanner and the surface of the map object; and (ii) the distance from the surface of the map object.

5. The method according to claim 3, the method comprising filling in one or more gaps in the depth map for which no distance data is available to produce a gap filled depth map.

6. The method according to claim 1, wherein the method comprises projecting at least one laser beam generated by the laser scanner onto the at least one surface of the map object, receiving a reflected laser beam, and determining data indicative of a distance of the laser scanner from at least one point on the at least one surface of the at least one map object.

7. The method according to claim 1, wherein the normal map comprises an image, the image comprising one or more pixels, wherein one or more pixel values are representative of a normal vector associated with at least one point of at least one surface of the at least one map object.

8. The method according to claim 7, wherein red, green and blue values of a pixel are representative of coordinates defining the normal vector for a point of the surface of the map object represented by that pixel.

9. The method according to claim 1, wherein generating the normal map comprises, for at least one pixel of the depth map or gap filled depth map, taking the cross product of at least three closest points to the pixel on the depth map or gap filled depth map in order to determine a normal vector of a point of the surface of the map object associated with that pixel of the depth map or gap filled depth map.

10. The method according to claim 1, wherein the generation of the texture or light map comprises providing or determining at least one light source position, providing or determining at least one normalized light direction vector representative of a direction of the light source from at least one point on the at least one surface of the at least one map object and taking the dot product of at least one normal vector represented by at least one point or pixel in the normal map and the at least one normalized light direction vector from the light source position to a point of the surface of the map object associated with the point or pixel of the normal map.

11. The method according to claim 1, wherein the combination of the texture map and image is based on pixel values of the texture map and pixel values of the image being combined on a pixel by pixel basis.

12. The method according to claim 1, wherein the or each one of the normalized one or more vectors is represented as a value between −1 and 1.

13. A non-transitory computer program element comprising computer program code means to make a computer execute the method of claim 1.

14. A system for producing a pseudo 3D image of one or more map objects, the system comprising:
    a memory;
    a processor, wherein the processor is configured to:
    acquire an image at least part of a map object, acquire laser scan data of the at least part of the map object, the laser scan data representing distances from a laser scanner to one or more points on surface of the at least one map object, determine a normal map, the normal map comprising or being representative of one or more normal vectors of at least one point of the at least one surface of the at least one map object, normalize said one or more normal vectors, generate, from the normal map, a texture map associated with the at least one map object from the laser scan data, the texture map being representative of light reflected from and/or shadows on the at least one surface of the map object, and process the texture map and the image by combining corresponding portions of the texture map and image in order to generate a pseudo 3D image representing the at least part of the map object.

15. A system according to claim 14, wherein the processor comprises a graphics processing unit (GPU).

16. The system of claim 14, wherein the system is a mobile mapping system comprising at least one laser scanner.

17. The system of claim 14, wherein the combination of the texture map and image is based on pixel values of the texture map and pixel values of the image being combined on a pixel by pixel basis.

18. The system of claim 14, wherein the or each one of the normalized one or more vectors is represented as a value between −1 and 1.

* * * * *